United States Patent
Marmon (10) Patent No.: US 11,055,377 B2
(45) Date of Patent: Jul. 6, 2021

(54) PERSONALIZED TRANSLATION OF CONTENT IDENTIFIERS

(71) Applicant: Apple Inc., Cupertino, CA (US)

(72) Inventor: Steve E. Marmon, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/782,935

(22) Filed: Feb. 5, 2020

(65) Prior Publication Data
US 2020/0301991 A1 Sep. 24, 2020

Related U.S. Application Data

(60) Provisional application No. 62/822,661, filed on Mar. 22, 2019.

(51) Int. Cl.
| | | |
|---|---|---|
| *H04L 29/08* | (2006.01) | |
| *G06F 16/955* | (2019.01) | |
| *G06F 16/957* | (2019.01) | |
| *G06F 16/909* | (2019.01) | |
| *G06F 16/958* | (2019.01) | |

(52) U.S. Cl.
CPC ........ *G06F 16/9566* (2019.01); *G06F 16/909* (2019.01); *G06F 16/958* (2019.01); *G06F 16/9558* (2019.01); *G06F 16/9574* (2019.01); *H04L 67/2823* (2013.01); *H04L 67/32* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,230,819 | B2* | 3/2019 | Richardson | H04L 67/327 |
| 2002/0099852 | A1* | 7/2002 | Fischer | G06F 16/9577 |
| | | | | 709/246 |
| 2006/0112167 | A1* | 5/2006 | Steele | H04L 65/602 |
| | | | | 709/206 |
| 2011/0055679 | A1* | 3/2011 | Shiimori | H04L 67/34 |
| | | | | 715/208 |
| 2011/0153583 | A1* | 6/2011 | Goldband | G06F 16/9566 |
| | | | | 707/706 |
| 2012/0203861 | A1* | 8/2012 | Flack | G06Q 10/10 |
| | | | | 709/217 |
| 2017/0228469 | A1* | 8/2017 | Spivack | G06F 16/9535 |

* cited by examiner

*Primary Examiner* — Shirley X Zhang
(74) *Attorney, Agent, or Firm* — Invoke (57) ABSTRACT

In some implementations, a user device can perform personalized translation of content identifiers. For example, the user device can request a content identifier mapping file from a server device that defines how to translate a human readable content identifier into a content server content identifier. The server device can select a mapping file from among a collection of mapping files based on various criteria associated with the user device and send the selected mapping file to the user device. When the user device receives a human readable content identifier, the user device can compare the human readable content identifier to the mapping file to determine how to translate the human readable content identifier into the content server content identifier. Once the content server content identifier corresponding to the human readable content identifier is determined, the client device can use the content server content identifier to obtain corresponding content.

20 Claims, 7 Drawing Sheets

PERSONALIZED TRANSLATION OF CONTENT IDENTIFIERS

INCORPORATION BY REFERENCE

The following application is hereby incorporated by reference: application No. 62/822,661 filed on Mar. 22, 2019. The Applicant hereby rescinds any disclaimer of claim scope in the parent application or the prosecution history thereof and advises the USPTO that the claims in this application may be broader than any claim in the parent application.

TECHNICAL FIELD

The disclosure generally relates to accessing resources on a network.

BACKGROUND

Currently, uniform resource locators (URLs) are used to identify and obtain content stored on network resources (e.g., servers). Given that a URL must be unique to a content item to correctly identify and obtain the content item, URLs can be a long and awkward combination of characters (e.g., letters and numbers). While these URLs are easily processed by the computing devices (e.g., servers, routers, etc.) that process these URLs, these URLs are not easily understood or remembered by humans who see or hear them.

While efforts have been made to generate shorter URLs that are more easily managed by humans, these shorter URLs must be translated from their shorter form into their longer server-recognized form when accessing the content associated with the URL. To perform the translation, network devices (e.g., a server) can store a mapping file that maps the shorter URL to the longer URL that the content server can use to identify a requested content item. While this mechanism works for translating shorter URLs to longer content-server URLs, this mechanism also fails to provide the flexibility to redirect different users to different content based on the same short URL. This mechanism also creates a privacy risk because the URL translation server can monitor all of the network traffic passing through the URL translation server and determine what content each of the end user devices, and ultimately the end users, are consuming.

SUMMARY

In some implementations, a user device can perform personalized translation of content identifiers. For example, the user device can request a content identifier mapping file from a server device that defines how to translate a human readable content identifier into a content server content identifier. The server device can select a mapping file from among a collection of mapping files based on various criteria associated with the user device and send the selected mapping file to the user device. When the user device receives a human readable content identifier, the user device can compare the human readable content identifier to the mapping file to determine how to translate the human readable content identifier into the content server content identifier. Once the content server content identifier corresponding to the human readable content identifier is determined, the client device can use the content server content identifier to obtain corresponding content.

Particular implementations provide at least the following advantages. Human readable content identifiers are easier for humans to read, speak, hear, and remember. Thus, human readable content identifiers make it easier to direct consumers to promotional content, news article features, and other media through audio and/or visual technologies. Performing translations of human readable content identifiers into server content identifiers on the user's device enhances user privacy by reducing the number of network devices that can monitor user content consumption behaviors. By configuring and delivering personalized content identifier mapping files, the same human readable content identifier can cause different content to be delivered to different users according to various criteria thereby accommodating sharing of content between different users who may be in different geographic regions, speak different languages, or who may have different types of user devices.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
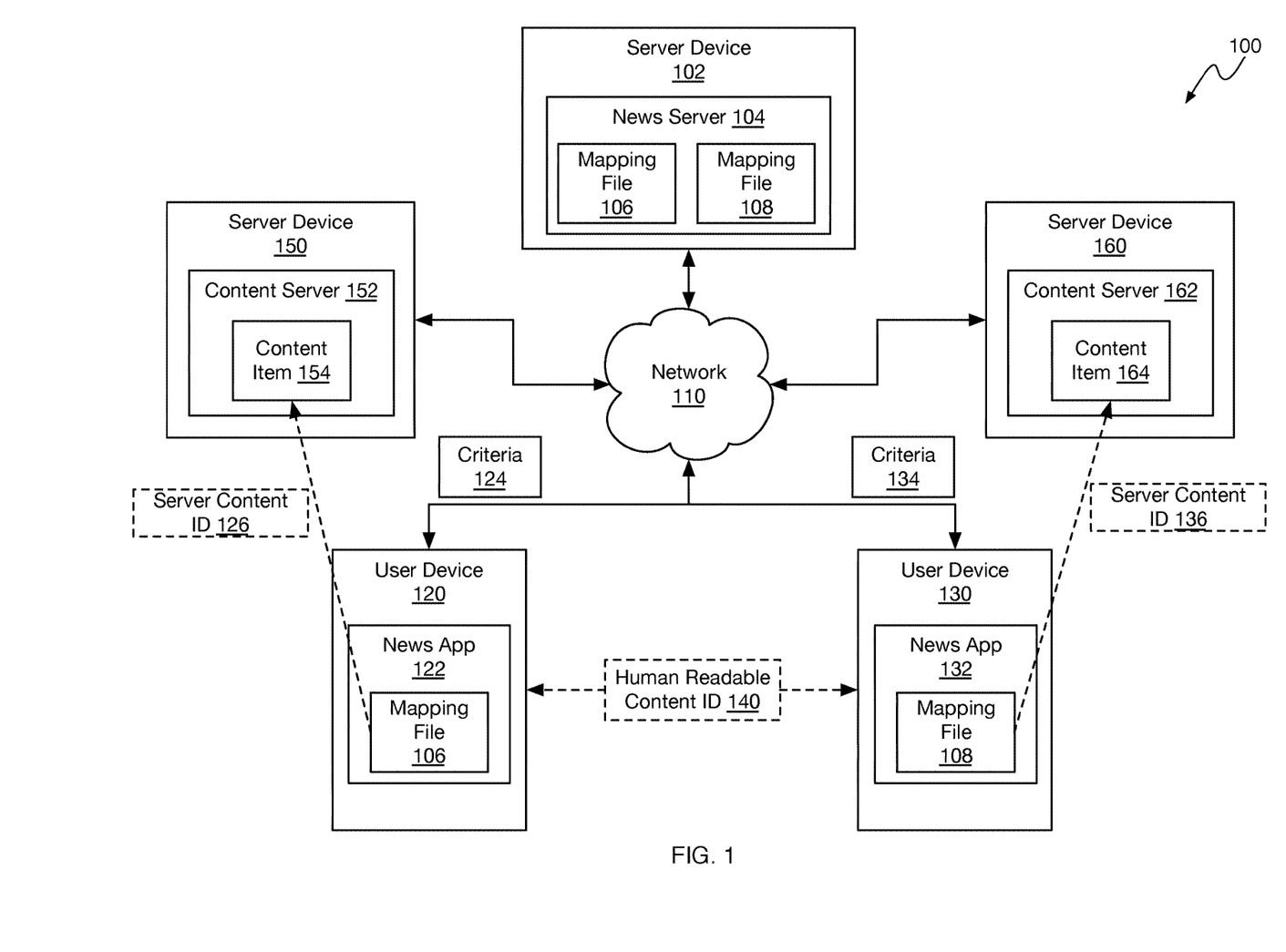
FIG. 1 is a block diagram of an example system for personalized translation of content identifiers.

FIG. 1 is a block diagram of an example system 100 for personalized translation of content identifiers. For example, system 100 can provide personalized content identifier mapping files to various user device so that the user device can perform on-device translation of human readable content identifiers to content server content identifiers. As described herein, a content identifier can correspond to a uniform resource locator (URL), a network address, a file path, or other identifier that can be used to identify content on a network or computing device.

In some implementations, system 100 can include server device 102. For example, server device 102 can be a network server device connected to other devices of system 100 through network 110. Server device 102 can include news server 104 (e.g., software) for delivering news related content and/or configuration data to news applications (e.g., news app 122, news app 132, etc.) installed on corresponding user devices (e.g., client devices, user device 120, user device 130, etc.). News server 104 can, for example, aggregate content received from servers (e.g., server device 150, server device 160, etc.) managed by various content providers (e.g., news agencies, media outlets, publishers, content generators, etc.) and deliver the aggregated content to the news applications running on the user devices. The news apps can then present the aggregated content to the users of the user device through various graphical user interfaces.

In some implementations, news server 104 can be configured with mapping files (e.g., mapping file 106, mapping file 108, etc.) that define mappings between human readable content identifiers and content server content identifiers. For example, a human readable content identifier can be a content identifier constructed using written human language (e.g., words, phrases, symbols, etc.) that may be easily remembered by a person familiar with the written human language (e.g., French, English, Chinese, etc.) who sees or hears the human readable content identifier. In contrast, a content server content identifier, or server content identifier, can be a content identifier constructed using any combination of characters (e.g., letters, numbers, symbols, etc.) that can be used to uniquely identify an item of content stored on or managed by a server device. In order to make the server content identifier unique to a particular content item, the server content identifier may include a long string of characters that combines letters, numbers, and symbols in a way that does not form words associated with a human language. Thus, the server content identifier may not be easily read, heard, or remembered by humans.

In some implementations, the human readable content identifiers in the mapping files may be automatically generated. For example, news server 104 can receive server content identifiers from various content provider servers for content items (e.g., articles, blogs, videos, etc.) that will be aggregated and/or served to news application 122 by news server 104. News server 104 can analyze the content items corresponding to the server content identifiers for keywords (e.g., important words that represent the subject matter of the content items) and use one or more of the keywords to automatically generate the human readable content identifiers that will be mapped to the server content identifiers in the mapping files. As another example, news server 104 may aggregate content items from content providers into a subject matter hub (e.g., grouping), a publisher channel, promotional campaign, or other organizational construct. These organizational constructs may have titles (e.g., "Election Results," or publisher name) that identify the content item grouping. News server 104 can automatically generate a human readable content identifier for the content item groupings based on the titles assigned to the grouping. Thus, for the "Election Results" content hub, news server 104 may generate a human readable content identifier such as "www.news.com/electionresults" and store a mapping between this human readable content identifier and the server content identifier that can be used to access the content server or news server 104 that provides access to this content hub in the mapping files.

In some implementations, the mapping files can include human curated mappings. For example, the mapping files can be generated by people who can identify the most popular articles, hubs, channels, etc., and generate human readable content identifiers for these content items. These people can then generate the mappings between the human readable content identifiers and the server content identifiers associated with the content items and store the mappings in the mapping files.

As described herein, the human readable content identifier can be mapped to different server content identifiers in different mapping files. For example, mapping files configured for French users may be configured such that a particular human readable content identifier is mapped to a server content identifier associated with a French content provider managing a content server in France. Mapping files configured for United States users may be configured such that the same particular human readable content identifier is mapped to a different server content identifier associated with a United States content provider managing a content server in the United States of America. Thus, the same human readable content identifier may cause user devices in different geographic locations or regions to be redirected to different content items and/or different content providers.

In some implementations, the content identifier mapping files can be configured with different mappings for different user device based on criteria associated with the user devices. For example, mapping file 106 may be configured for user devices associated with a first set of criteria, while mapping file 108 may be configured for user devices associated with a second set of criteria. The criteria can include, for example, a language setting (e.g., English, French, German, Chinese, etc.) associated with the user device. The criteria can include a geographic location, region, country, or other location data associated with the user device. The location data can correspond to a current location of the user device, as determined by location determining subsystems of the user device. The location data can correspond to a location specified by the user in the settings of the user device or other user account associated with system 100 and/or news server 104. The criteria can include other and/or additional criteria as may be described herein below.

News server 104 may be configured with an association between mapping files and criteria. For example, mapping file 106 can be associated with the French language and the France country location, while mapping file 108 can be associated with the English language and the United States country location. Additionally, the content identifier mappings within the mapping files may be different based on the criteria associated with the mapping file. For example, both mapping file 106 and mapping file 108 may include the human readable content identifier "www.news.com/electionresults," however, mapping file 106 associated with the French language and France, may associate this human readable content identifier with a content server content identifier that identifies a French language content item stored on a server of a French content provider in France. By comparison, mapping file 108 associated with the English language and the United States, may associate this human readable content identifier with a content server content identifier that identifies an English language content item stored on a server of an English content provider in the United States. Thus, the different criteria associated with different user devices may cause news server 104 to deliver different content identifier mapping files to different client devices thereby causing the different client devices to obtain, for the same human readable content identifier, different content items from different sources.

In some implementations, system 100 can include user device 120. For example, user device 120 can be an end user computing device, such as a desktop computer, laptop computer, handheld device, smartphone, smartwatch, tablet computer, or the like. User device 120 can include news application 122. For example, news application 122 can be configured to communicate with news server 104 through network 110 to obtain content and/or configuration for news application 122. News application 122 can send a request for a content identifier mapping file to news server 104. The request can include criteria 124.

As described above, the criteria (e.g., criteria 124, criteria 134, etc.) can include location information, language settings, and/or country settings. The criteria can include device type (e.g., smartphone, tablet computer, laptop computer, smartwatch, operating system make and/or version, etc.). The criteria can include capabilities information for user device 120, such as display screen size, processor capabilities, network connection information (network speed, bandwidth, connection type, Wi-Fi, cellular data, etc.), software installed on user device, etc. The criteria can include content provider preferences and/or content topics of interest determined for the user of user device 120. The criteria can include information identifying whether the user of user device 120 is a new user of news application 122 or whether the user of user device 120 is heavy user of news application 122. For example, for a human readable content identifier associated with promotional content, a user device associated with a new user may receive a mapping file that associates the human readable content identifier to promotional content directed to new users, while a user device associated with a heavy user may receive a mapping file that associates the human readable content identifier to promotional content directed to heavy users of news application 122. Other criteria can include demographic information, such as age groups or gender.

When news server 104 receives the mapping file request, including criteria 124, news server 104 can determine which mapping file (e.g., mapping file 106) most closely matches the criteria data in criteria 124. Thus, if criteria 124 indicates that user device 120 is associated with the French language and the country France, news server 104 can select a mapping file (e.g., mapping file 106) that is also associated with the French language and the country France. In some implementations, news server 104 may not use all of the provided criteria 124 to select a mapping file. For example, news server 104 may select a mapping file based on a single criterion (e.g., language or location) or news server 104 may select a mapping file based on a combination of the criteria described herein. Once the mapping file (e.g., mapping file 106) is selected, news server 104 can send the selected mapping file 106 to news application 122 on user device 120. User device 120 can then store mapping file 106 so that the mapping file may be used to translate human readable content identifiers into content server content identifiers that can be used to obtain content items (e.g., news articles, opinion pieces, blogs, videos, images, advertisements, etc.) from corresponding content servers.

In some implementations, system 100 can include user device 130. For example, user device 130 can be configured the same as, or similarly to, user device 120. User device 130 can include news application 132. However, user device 130 may be associated with different criteria than user device 120. For example, while user device 120 may be associated with the country (e.g., location) France and the French language, user device 130 may be associated with the country (e.g., location) United States of America and the English language. Thus, the criteria (e.g., criteria 134) that news application 132 sends to news server 104 in a request for a mapping file may be different than the criteria that news application 122 sends to news server 104. Because of these differences in criteria, news server 104 may select a different content identifier mapping file (e.g., mapping file 108) for user device 130 than the content identifier mapping file (e.g., mapping file 106) selected for user device 120. After selecting mapping file 106 based on criteria 134 received from news application 132, news server 104 can send mapping file 106 to user device 130. User device 130 can then store mapping file 106 on user device 130 for later use in translating human readable content identifiers to server content identifiers, as described herein.

Figure 2:
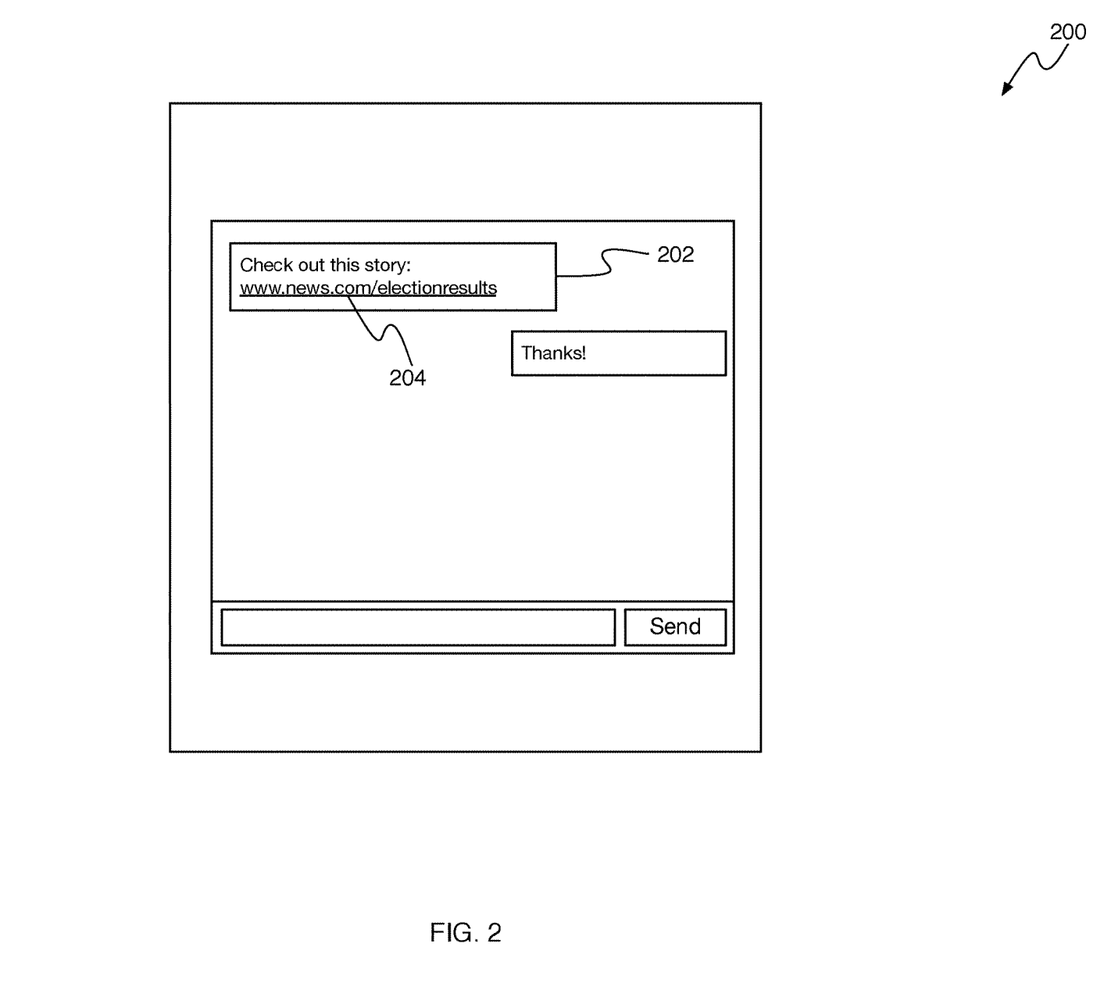
FIG. 2 illustrates an example graphical user interface for receiving a human readable content identifier.

In some implementations, user device 120 can perform on device translation of human readable content identifiers into server content identifiers. For example, user device 120 may receive a human readable content identifier 140 (e.g., "www.news.com/electionresults"). User device 120 may receive human readable content identifier 140 when the user of user device 120 receives an electronic message (e.g., email, SMS message, instant message, social media message, etc.) that includes human readable content identifier 140 as illustrated by FIG. 2. User device 120 may receive human readable content identifier 140 when the user views a webpage that includes the human readable content identifier 140. User device 120 may receive human readable content identifier 140 when the user views a content through an application (e.g., news application 122) on user device 120 that includes the human readable content identifier 140.

Upon receipt or user selection of human readable content identifier 140, user device 120 can send human readable content identifier 140 to news application 122 for processing. For example, user device 120 may be configured to send content identifiers that include specific text to news application 122. For example, news application 122 may be associated with an application content identifier (e.g., "www.news.com"). When user device 120 receives a content identifier (e.g., human readable content identifiers, server content identifiers, etc.) that includes the application content identifier, then user device 120 can send the received content identifier to news application 122 for processing.

In some implementations, news application 122 can translate human readable content identifiers into server content identifiers. For example, when news application 122 receives human readable content identifier 140, news application 122 can compare human readable content identifier 140 to mapping file 106 to determine whether a mapping for human readable content identifier 140 exists within mapping file 106. When human readable content identifier 140 cannot be found in mapping file 106, then news application 122 can request a (e.g., new, updated) mapping file from news server 104, as described above. If the new mapping file does not include human readable content identifier 140, then news application 122 can present an error message to the user on a display of user device 120.

When human readable content identifier 140 is found in mapping file 106, then news application 122 can determine the server content identifier (e.g., server content identifier 126) that is mapped to human readable content identifier 140. In response to determining server content identifier 126, news application 122 can request the corresponding content item 154 from content server 152 on server device 150 using the server content identifier 126 through network 110 according to well-known methods. For example, server content identifier 126 may correspond to content item 154 stored on server device 150 located in France and managed by a French content provider.

In some implementations, user device 130 can perform on device translation of human readable content identifiers into server content identifiers. For example, user device 130 may receive a human readable content identifier 140 (e.g., "www.news.com/electionresults"). User device 130 may receive human readable content identifier 140 when the user of user device 130 receives an electronic message (e.g., email, SMS message, instant message, social media message, etc.) that includes human readable content identifier 140 as illustrated by FIG. 2. User device 130 may receive human readable content identifier 140 when the user views a webpage that includes the human readable content identifier 140. User device 130 may receive human readable content identifier 140 when the user views a content through an application (e.g., news application 132) on user device 130 that includes the human readable content identifier 140.

Upon receipt or user selection of human readable content identifier 140, user device 130 can send human readable content identifier 140 to news application 132 for processing. For example, user device 130 may be configured to send content identifiers that include specific text to news application 132. For example, news application 132 may be associated with an application content identifier (e.g., "www.news.com"). When user device 130 receives a content identifier (e.g., human readable content identifiers, server content identifiers, etc.) that includes the application content identifier, then user device 130 can send the received content identifier to news application 132 for processing.

In some implementations, news application 132 can translate human readable content identifiers into server content identifiers. For example, when news application 132 receives human readable content identifier 140, news application 132 can compare human readable content identifier 140 to mapping file 108 to determine whether a mapping for human readable content identifier 140 exists within mapping file 108. When human readable content identifier 140 cannot be found in mapping file 108, then news application 132 can request a (e.g., new, updated) mapping file from news server 104, as described above. If the new mapping file does not include human readable content identifier 140, then news application 132 can present an error message to the user on a display of user device 130.

When human readable content identifier 140 is found in mapping file 108, then news application 132 can determine the server content identifier (e.g., server content identifier 136) that is mapped to human readable content identifier 140 in mapping file 108. In response to determining server content identifier 136, news application 132 can request the corresponding content item 164 from content server 162 on server device 160 using the server content identifier 136 through network 110, using well-known methods. For example, server content identifier 136 may correspond to content item 164 stored on server device 160 located in the United States and managed by a United States content provider. As illustrated by the examples above, human readable content identifier 140 can be mapped to different server content identifiers (e.g., server content identifier 126, server content identifier 136, etc.) in different mapping files (e.g., mapping file 106, mapping file 108, etc.), thereby causing different user devices to be directed to different content server devices when the same human readable content identifier is received and/or selected. Thus, the user's experience viewing content on the user device can be personalized using the content identifier mapping files.

FIG. 2 illustrates an example graphical user interface 200 for receiving a human readable content identifier. For example, graphical user interface 200 can correspond to an electronic messaging graphical user interface (GUI) presented by an email application, social media application, short message service application, instant messaging application, or the like. While electronic messaging is used here as an example of how a human readable content identifier may be received by a user device, the human readable content identifier may be received in other ways, such as through a browser application, webpage, application user interface, etc.

In the example of FIG. 2, user device 120 may receive an electronic message 202 from user device 130 that includes human readable content identifier 204 (e.g., human readable content identifier 140). When message 202 is received by user device 120, or when the user of user device 120 selects human readable content identifier 204, user device 120 can translate human readable content identifier 204 into a corresponding server content identifier using the mapping file (e.g., mapping file 106) stored on user device 120, as described above. In some instances, the differences between mapping files delivered to, and stored on, different user devices (e.g., user device 120, user device 130) may result in the same human readable content identifier 204 causing two different content items to be presented on the two different user devices. In the electronic messaging example above, this could cause user device 120 to obtain and present content associated with human readable content identifier 204 on user device 120 that is different than, although possibly equivalent to, the content associated with human readable content identifier 204 associated with human readable content identifier 204 on user device 130. For example, if user device 120 is located in France, user device 120 may obtain and present a French version of the content associated with the human readable content identifier 204 while user device 130 may have presented an English version of the content associated with the human readable content identifier 204. By providing flexibility and configurability in interpreting or translating human readable content identifier 204, system 100 can be configured to avoid the problem of broken links when sharing content between different geographical regions and can tailor content delivery to the personalized criteria associated with each user device.

Figure 3:
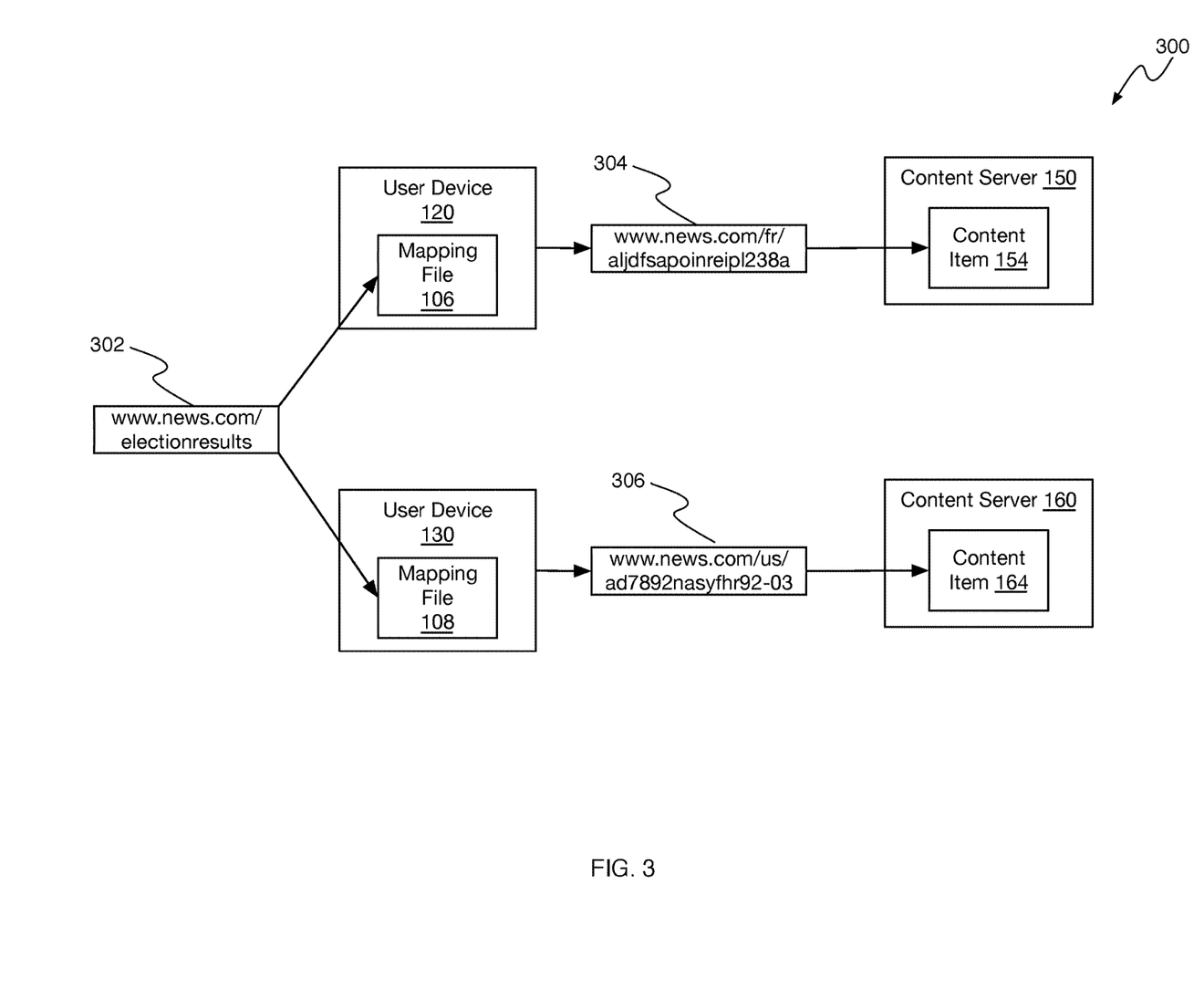
FIG. 3 is a block diagram of system for translating a human readable content identifier into two different content server content identifiers.

FIG. 3 is a block diagram of system 300 for translating a human readable content identifier into two different content server content identifiers. As described above, mapping files 106 and 108 may include different content server identifier mappings for human readable content identifier 302 depending on the criteria associated with each user device. For example, using mapping file 106, user device 120 may translate human readable content identifier 302 into server content identifier 304, while user device 130 may use mapping file 108 to translate human readable content identifier 302 into server content identifier 306. User devices 120 and/or 130 can then use the server content identifiers 304 and 306 to obtain content items 154 and/or 164 from content servers 150 and/or 160, respectively. As can be seen in FIG. 3, while human readable content identifier (e.g., "www.news.com/electionresults") is very human friendly and easy for humans to comprehend and remember, server content identifiers 304 and 306 are not easy for humans to comprehend and remember. Thus, human readable content identifier 302 makes it easier for users to share content identifiers with other users visually (e.g., television, billboards, print advertisements, etc.), orally (e.g., person to person, radio, video, podcasts, etc.), and/or through devices (e.g., webpages, electronic messaging, etc.), and makes it easier for users to interact with their user devices to obtain desired content.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 4:
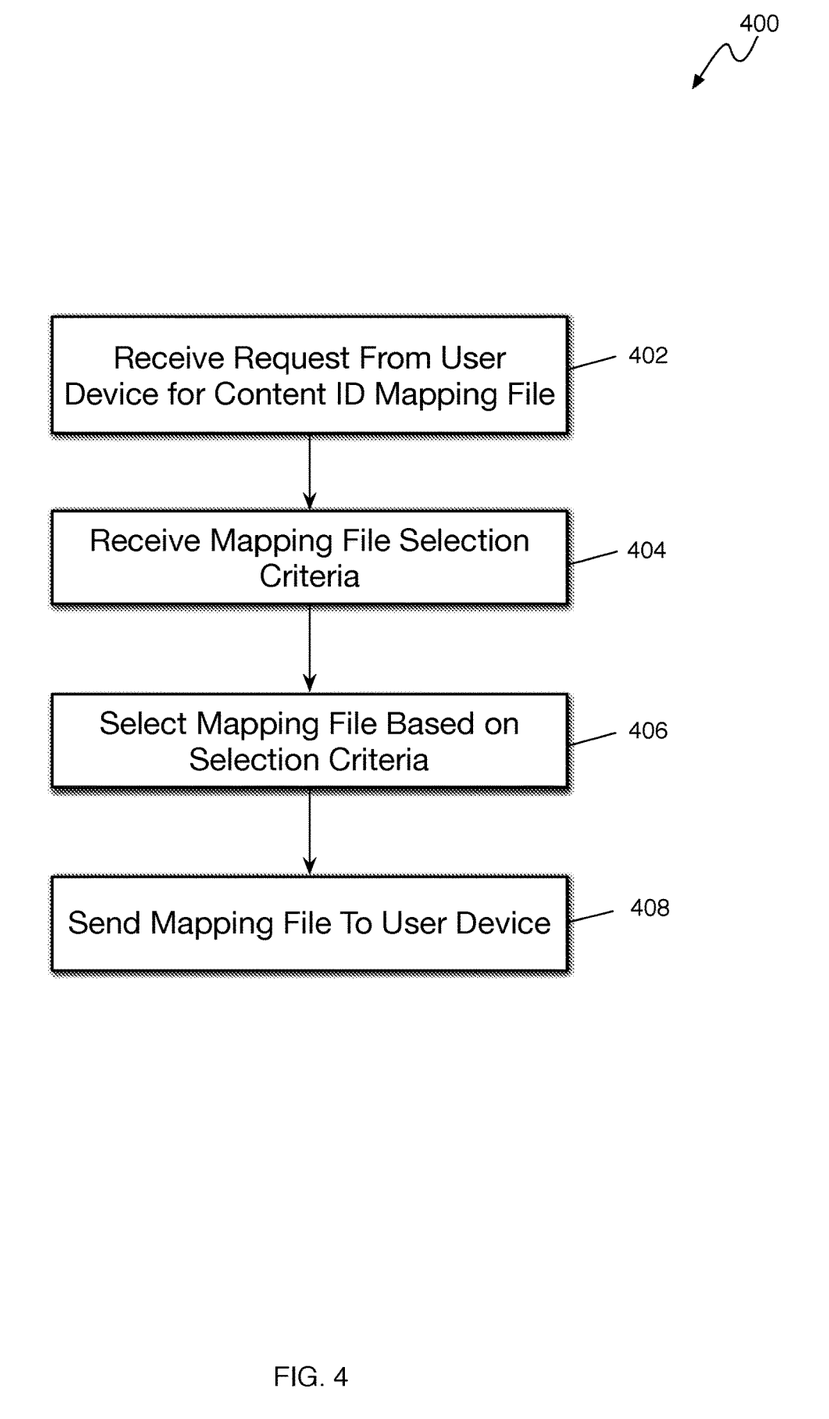
FIG. 4 is flow diagram of an example process for selecting a mapping file for personalized translation of content identifiers.

FIG. 4 is flow diagram of an example process 400 for selecting a mapping file for personalized translation of content identifiers. For example, process 400 can be performed by server device 102 to select a content identifier mapping file for a user device based on criteria associated with the user device.

At step 402, server device 102 can receive a request from a user device for a content identifier mapping file. For example, server device 102 can receive a mapping file request from user device 120 (or user device 130).

At step 404, server device 102 can receive mapping file selection criteria. For example, server device 102 can receive the criteria in the request received at step 402. The request can include criteria associated with user device 120 that can be used to select an appropriate mapping file from among many mapping files configured on server device 102. The criteria can be obtained from news server account information associated with user device 120 and stored on news server 102. The criteria can include, among other things, a language setting, a country, and/or a location associated with user device 120 that can be used to personalize the selection of the content identifier mapping file to user device 120 and/or the user of user device 120.

At step 406, server device 102 can select a content identifier mapping file based on the selection criteria. For example, server device 102 can store a repository of content identifier mapping files where each mapping file corresponds to a set of (e.g., one or more) criteria. Server device 102 can compare the selection criteria received at step 404 to the set of criteria corresponding to each mapping file to determine which mapping file to send to client device 120. For example, server device 102 can select a particular mapping file when the set of criteria corresponding to the particular mapping file includes matching values for one or more of the selection criteria received at step 404. Server device 102 can select a particular mapping file when the set of criteria corresponding to the particular mapping file includes matching values for all of the selection criteria received at step 404. Server device 102 can select a particular mapping file when the set of criteria corresponding to the particular mapping file includes matching values for specific items of the selection criteria received at step 404, such as location, country, language, etc. In some implementations, the set of criteria for a mapping file can specify a minimum set of criteria for matching a mapping file to a user device. For example, while the selection criteria associated with user device 120 may include ten items, the set of criteria corresponding to a mapping file may include three items. As long as those three items are found within the selection criteria, the corresponding mapping file may be selected by server device 102 for delivery to user device 120.

At step 408, server device 102 can send the selected mapping file to the user device. For example, server device 102 can send the selected mapping file to user device 120 so that user device 120 can use the selected mapping file to translate human readable content identifiers into content server content identifiers. Thus, the selection of mapping files may be personalized for each user and/or user device.

Figure 5:
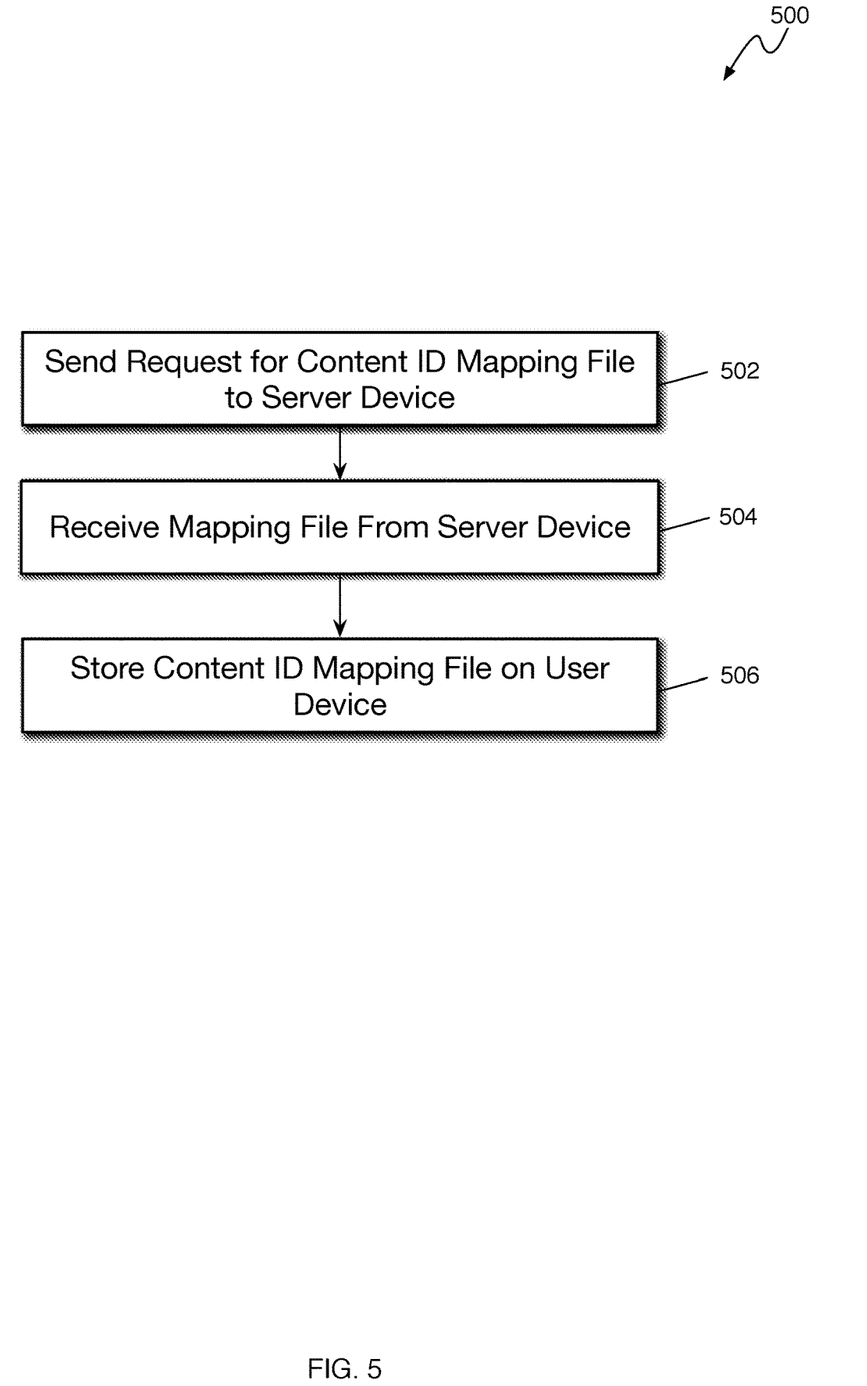
FIG. 5 is flow diagram of an example process for requesting a mapping file for personalized translation of content identifiers.

FIG. 5 is flow diagram of an example process 500 for requesting a mapping file for personalized translation of content identifiers. For example, process 500 can be performed by a user device to obtain a content identifier mapping file to be used for translating human readable content identifiers into content server content identifiers.

At step 502, a user device can send a request for a content identifier mapping file to a server device. For example, user device 120 can send a mapping file request to server device 102. The mapping file request can include various criteria that server device 102 can use to select a content identifier mapping file for user device 120. For example, the criteria can include a language setting (e.g., English, French, Chinese, Japanese, etc.) of user device 120, a location (e.g., a country identifier, coordinates, geographic region, etc.) associated with user device 120, and/or other criteria as may be described herein. User device 120 can periodically (e.g., according to a time interval) send mapping file requests to obtain updated mapping files as the mapping files may evolve or change over time. User device 120 can send mapping file requests to obtain updated mapping files in response to an event. For example, the event can correspond to invoking news application 122, closing news application 122, installing a new version of news application 122, and/or determining that a received human readable content identifier does not exist in a mapping file currently stored on user device 120.

At step 504, the user device can receive a mapping file from the server device. For example, in response to the request sent at step 502, user device 120 can receive a mapping file that maps human readable content identifiers to corresponding content server content identifiers.

At step 506, the user device can store the received content identifier mapping file on user device 120. For example, if no content identifier mapping file currently exists on user device 120, user device 120 can store the received content identifier mapping file. Alternatively, if a content identifier mapping file already exists on user device 120, user device 120 can replace the existing content identifier mapping file with the content identifier mapping file received from server device 102. Thus, user device 102 can receive and store a content identifier mapping file that is personalized to the various criteria associated with user device 120.

Figure 6:
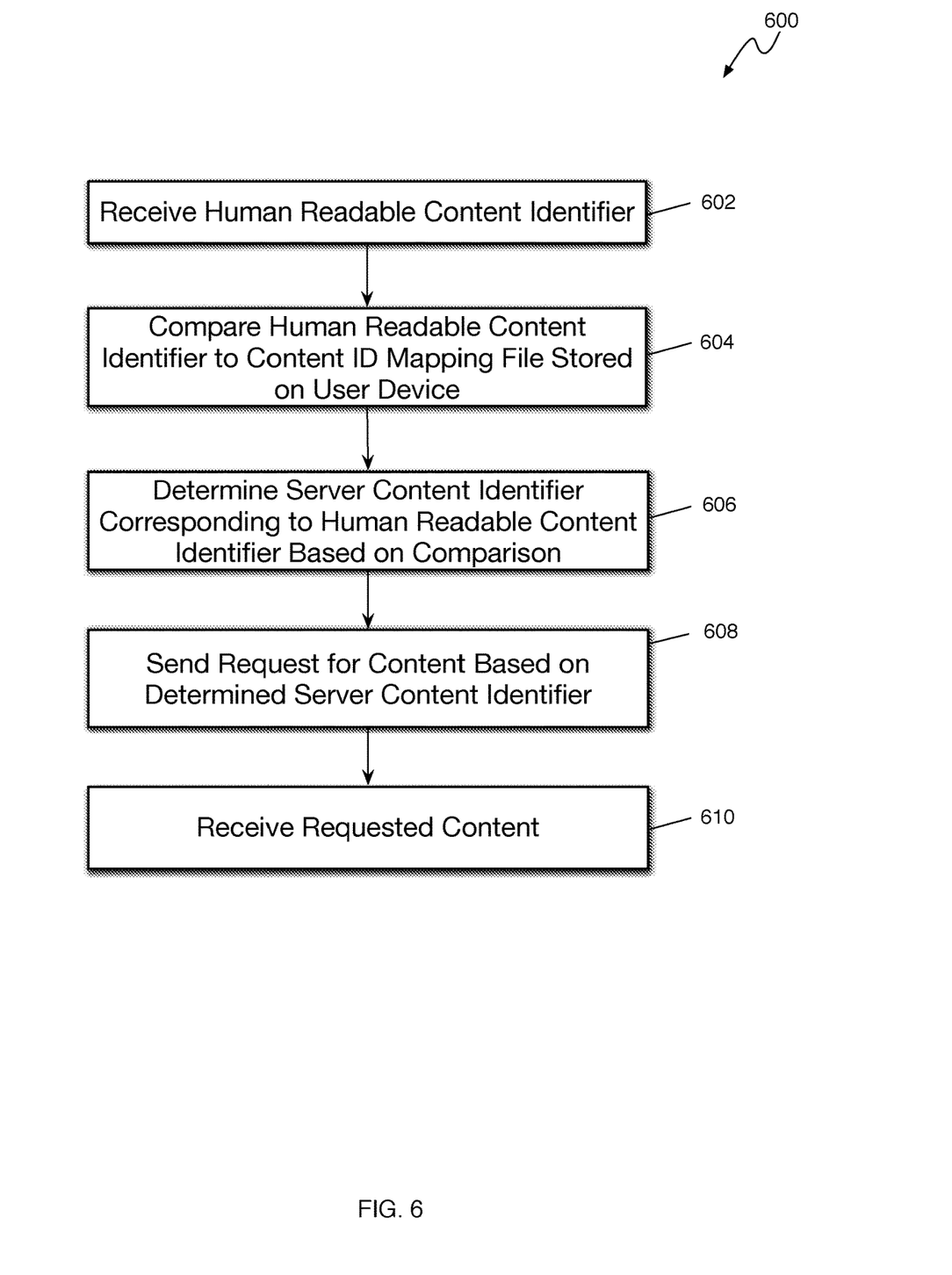
FIG. 6 is flow diagram of an example process for using a mapping file for personalized translation of content identifiers.

FIG. 6 is flow diagram of an example process 600 for using a mapping file for personalized translation of content identifiers. For example, process 600 can be performed by user device 120 (or user device 130) to translate human readable content identifiers into content server content identifiers that can be used to retrieve or obtain content associated with the human readable content identifiers.

At step 602, user device 120 can receive a human readable content identifier. For example, user device 120 can receive the human readable content identifier in an electronic message, from a webpage downloaded into a web browser, from a software application, or from user input providing the human readable content identifier to user device 120 and/or a software application executing thereon.

At step 602, user device 120 can compare the human readable content identifier to a content identifier mapping file stored on user device 120. For example, user device 120 can compare the received human readable content identifier to human readable content identifiers included in the content identifier mapping file to determine whether received the human readable content identifier exists in the content identifier mapping file. If the received human readable content identifier does not exist in the mapping file, then user device 120 can request an updated mapping file from server device 102, as described above. If the received human readable content identifier exists in the mapping file, process 600 can continue to step 606.

At step 606, user device 120 can determine a server content identifier corresponding to the received human readable content identifier based on the comparison. For example, since the mapping file includes mappings of human readable content identifiers to content server content identifiers, user device 120 can determine the server content identifier corresponding to the received human readable content identifier by determining which server content identifier is mapped to the human readable content identifier in the mapping file.

At step 608, user device 120 can send a request for content based on the determined server content identifier. For example, user device 120 may use the content server content identifier to route a content request for a particular content item identified by the content server content identifier to the appropriate content server through network 110 (e.g., a local area network, wide area network, the Internet, etc.) using well known mechanisms.

At step 610, user device 120 can receive the requested content corresponding to the content server content identifier. For example, the content server can send a content item corresponding to the content server content identifier to user device 120. Upon receipt of the content item (e.g., document, image, webpage, video, news article, advertisement, article hub, content provider channel, etc.), user device 120 can present the content item on a display of user device 120.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to personalize translations of human readable content identifiers on user devices. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to perform personalized translations of human readable content identifiers so that delivered content is more relevant to a user's language, geographic region, location, or other criteria. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of personalized translations of human readable content identifiers, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content identifier mapping files can be selected and delivered to users by inferring selection criteria based on non-personal information data or a bare minimum amount of personal information, such as the content being requested by the device associated with a user, other non-personal information available to the news server, or publicly available information.

Example System Architecture

Figure 7:
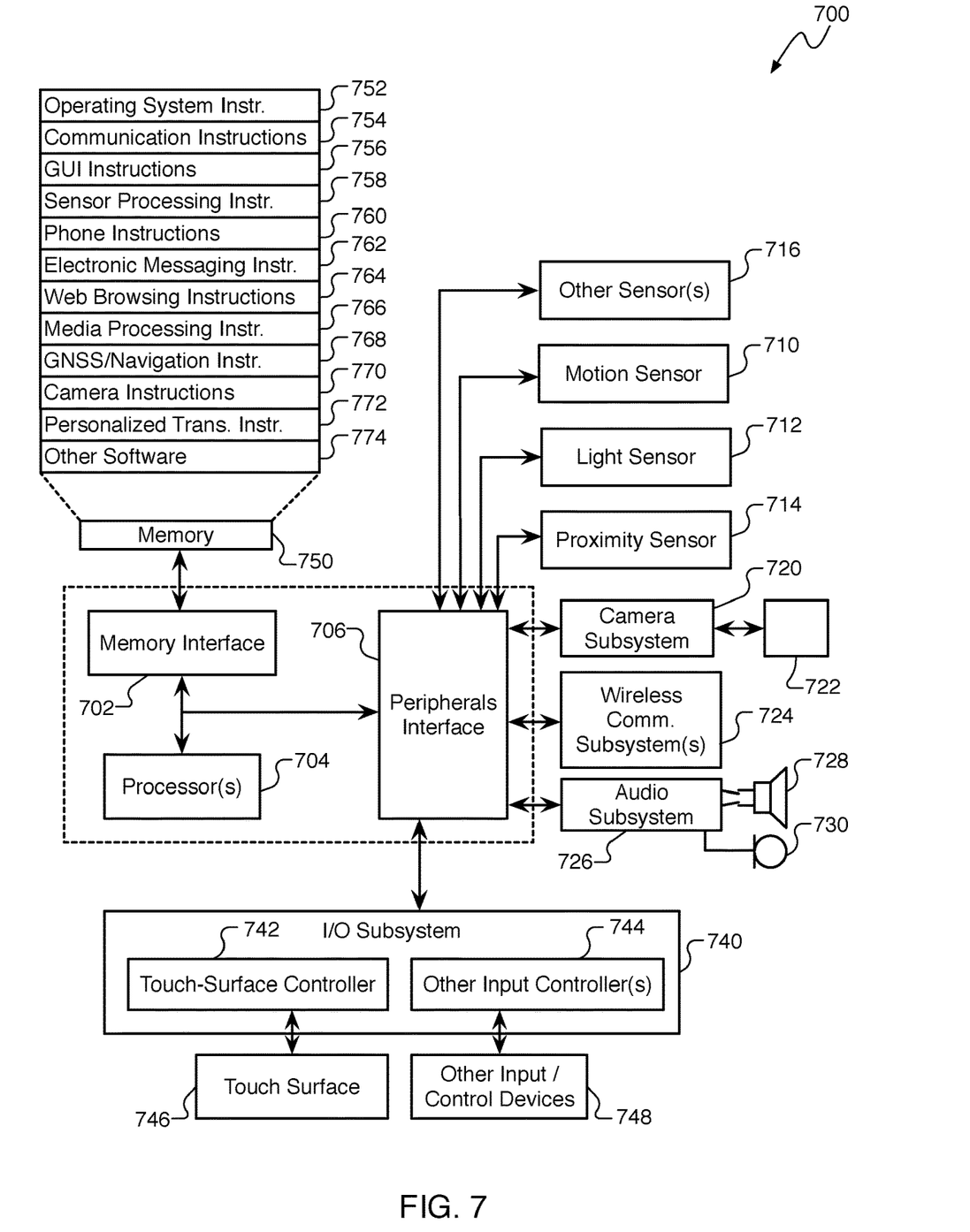
FIG. 7 is a block diagram of an example computing device that can implement the features and processes of FIGS. 1-6.

FIG. 7 is a block diagram of an example computing device 700 that can implement the features and processes of FIGS. 1-6. The computing device 700 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the computing device 700 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate orientation, lighting, and proximity functions. Other sensors 716 can also be connected to the peripherals interface 706, such as a global navigation satellite system (GNSS) (e.g., GPS receiver), a temperature sensor, a biometric sensor, magnetometer or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips. The camera subsystem 720 and the optical sensor 722 can be used to collect images of a user to be used during authentication of a user, e.g., by performing facial recognition analysis.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computing device 700 is intended to operate. For example, the computing device 700 can include communication subsystems 724 designed to operate over a GSM network, a GPRS network, an EDGE network, a Wi-Fi or WiMax network, and a Bluetooth™ network. In particular, the wireless communication subsystems 724 can include hosting protocols such that the device 100 can be configured as a base station for other wireless devices.

An audio subsystem 726 can be coupled to a speaker 728 and a microphone 730 to facilitate voice-enabled functions, such as speaker recognition, voice replication, digital recording, and telephony functions. The audio subsystem 726 can be configured to facilitate processing voice commands, voiceprinting and voice authentication, for example.

The I/O subsystem 740 can include a touch-surface controller 742 and/or other input controller(s) 744. The touch-surface controller 742 can be coupled to a touch surface 746. The touch surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration can disengage a lock of the touch surface 746; and a pressing of the button for a second duration that is longer than the first duration can turn power to the computing device 700 on or off. Pressing the button for a third duration can activate a voice control, or voice command, module that enables the user to speak commands into the microphone 730 to cause the device to execute the spoken command. The user can customize a functionality of one or more of the buttons. The touch surface 746 can, for example, also be used to implement virtual or soft buttons and/or a keyboard.

In some implementations, the computing device 700 can present recorded audio and/or video files, such as MP3, AAC, and MPEG files. In some implementations, the computing device 700 can include the functionality of an MP3 player, such as an iPod™.

The memory interface 702 can be coupled to memory 750. The memory 750 can include high-speed random-access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks.

The operating system 752 can include instructions for handling basic system services and for performing hardware dependent tasks. In some implementations, the operating system 752 can be a kernel (e.g., UNIX kernel). In some implementations, the operating system 752 can include instructions for performing voice authentication. For example, operating system 752 can implement the personalized content identifier translation features as described with reference to FIGS. 1-6.

The memory 750 can also store communication instructions 754 to facilitate communicating with one or more additional devices, one or more computers and/or one or more servers. The memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions.

The memory 750 can store software instructions 772 to facilitate other processes and functions, such as the personalized content identifier translation processes and functions as described with reference to FIGS. 1-6.

The memory 750 can also store other software instructions 774, such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method comprising:
   receiving, by a server device, a first mapping file request from a first user device;
   obtaining, by the server device, one or more first criteria associated with the first user device;
   selecting, by the server device, a first content identifier mapping file from a plurality of content identifier mapping files based on the one or more first criteria, where the first content identifier mapping file includes mappings of human readable content identifiers to corresponding content server content identifiers; and
   sending, by the server device, the first content identifier mapping file to the first user device, where the first user device is configured to translate human readable content identifiers to content server content identifiers based on the first content identifier mapping file.

2. The method of claim 1, where the one or more first criteria include a geographic location associated with the user device; and further comprising:
   selecting, by the server device, the first content identifier mapping file from the plurality of content identifier mapping files based on the geographic location.

3. The method of claim 1, where the one or more first criteria include a language associated with the user device; and further comprising:
   selecting, by the server device, the first content identifier mapping file from the plurality of content identifier mapping files based on the language.

4. The method of claim 1, where the one or more first criteria include a device type associated with the user device; and further comprising:
   selecting, by the server device, the first content identifier mapping file from the plurality of content identifier mapping files based on the device type.

5. The method of claim 1, where the one or more first criteria include a device capability associated with the user device; and further comprising:
   selecting, by the server device, the first content identifier mapping file from the plurality of content identifier mapping files based on the device capability.

6. The method of claim 1, further comprising:
   receiving, by the server device, a second mapping file request from a second user device;
   obtaining, by the server device, one or more second criteria associated with the second user device, where the one or more second criteria are different than the one or more first criteria;
   selecting, by the server device, a second content identifier mapping file from the plurality of content identifier mapping files based on the one or more criteria, where the second user identifier mapping file is different than the first user identifier mapping file; and
   sending, by the server device, the second content identifier mapping file to the second user device, where the second user device is configured to translate human readable content identifiers to content server content identifiers based on the second content identifier mapping file.

7. The method of claim 1, wherein the first user device is a mobile device.

8. The method of claim 1, wherein the content server content identifiers are uniform resource locators.

9. A method comprising:
   sending, by a user device, a first mapping file request to a server device, the first mapping file request including one or more criteria associated with the user device;
   receiving, by the user device, a first content identifier mapping file, the first content identifier mapping file selected by the server device based on the one or more criteria;
   storing, by the user device, the first content identifier mapping file in memory of the user device, where the first content identifier mapping file includes mappings of human readable content identifiers to corresponding content server content identifiers;
   receiving, by the user device, a first human readable content identifier;
   determining, by the user device, a first content server content identifier corresponding to the first human readable content identifier based on the first content identifier mapping file; and
   obtaining, by the user device, a first content item based on the first content server content identifier.

10. The method of claim 9, further comprising:
    receiving, by the user device, a second human readable content identifier;
    determining, by the user device, the first content identifier mapping file stored on the user device does not include the second human readable content identifier; and
    sending, by the user device, a second mapping file request to a server device, the second mapping file request including one or more criteria associated with the user device;

receiving, by the user device, a second content identifier mapping file, the second content identifier mapping file selected by the server device based on the one or more criteria; and replacing, by the user device, the first content identifier mapping file stored in memory of the user device with the second content identifier mapping file, where the second content identifier mapping file includes mappings of human readable content identifiers to corresponding content server content identifiers.

11. A system comprising:

one or more processors; and a non-transitory computer readable medium including one or more sequences of instructions that, when executed by the one or more processors, cause the processors to perform operations comprising:

receiving, by a server device, a first mapping file request from a first user device;

obtaining, by the server device, one or more first criteria associated with the first user device;

selecting, by the server device, a first content identifier mapping file from a plurality of content identifier mapping files based on the one or more first criteria, where the first content identifier mapping file includes mappings of human readable content identifiers to corresponding content server content identifiers; and sending, by the server device, the first content identifier mapping file to the first user device, where the first user device is configured to translate human readable content identifiers to content server content identifiers based on the first content identifier mapping file.

12. The system of claim 11, where the one or more first criteria include a geographic location associated with the user device; and wherein the instructions cause the processors to perform operations comprising:

selecting, by the server device, the first content identifier mapping file from the plurality of content identifier mapping files based on the geographic location.

13. The system of claim 11, where the one or more first criteria include a language associated with the user device; and wherein the instructions cause the processors to perform operations comprising:

selecting, by the server device, the first content identifier mapping file from the plurality of content identifier mapping files based on the language.

14. The system of claim 11, where the one or more first criteria include a device type associated with the user device; and wherein the instructions cause the processors to perform operations comprising:

selecting, by the server device, the first content identifier mapping file from the plurality of content identifier mapping files based on the device type.

15. The system of claim 11, where the one or more first criteria include a device capability associated with the user device; and wherein the instructions cause the processors to perform operations comprising:

selecting, by the server device, the first content identifier mapping file from the plurality of content identifier mapping files based on the device capability.

16. The system of claim 11, wherein the instructions cause the processors to perform operations comprising:

receiving, by a server device, a second mapping file request from a second user device;

obtaining, by the server device, one or more second criteria associated with the second user device, where the one or more second criteria are different than the one or more first criteria;

selecting, by the server device, a second content identifier mapping file from the plurality of content identifier mapping files based on the one or more criteria, where the second user identifier mapping file is different than the first user identifier mapping file; and sending, by the server device, the second content identifier mapping file to the second user device, where the second user device is configured to translate human readable content identifiers to content server content identifiers based on the second content identifier mapping file.

17. The system of claim 11, wherein the first user device is a mobile device.

18. The system of claim 11, wherein the content server content identifiers are uniform resource locators.

19. A system comprising:

one or more processors; and a non-transitory computer readable medium including one or more sequences of instructions that, when executed by the one or more processors, cause the processors to perform operations comprising:

sending, by a user device, a first mapping file request to a server device, the first mapping file request including one or more criteria associated with the user device;

receiving, by the user device, a first content identifier mapping file, the first content identifier mapping file selected by the server device based on the one or more criteria;

storing, by the user device, the first content identifier mapping file in memory of the user device, where the first content identifier mapping file includes mappings of human readable content identifiers to corresponding content server content identifiers;

receiving, by the user device, a first human readable content identifier;

determining, by the user device, a first content server content identifier corresponding to the first human readable content identifier based on the first content identifier mapping file; and obtaining, by the user device, a first content item based on the first content server content identifier.

20. The system of claim 19, wherein the instructions cause the processors to perform operations comprising:

receiving, by the user device, a second human readable content identifier;

determining, by the user device, the first content identifier mapping file stored on the user device does not include the second human readable content identifier;

sending, by a user device, a second mapping file request to a server device, the second mapping file request including one or more criteria associated with the user device;

receiving, by the user device, a second content identifier mapping file, the second content identifier mapping file selected by the server device based on the one or more criteria; and replacing, by the user device, the first content identifier mapping file stored in memory of the user device with the second content identifier mapping file, where the second content identifier mapping file includes mappings of human readable content identifiers to corresponding content server content identifiers.

\* \* \* \* \*